Feb. 13, 1968   W. J. SAGAN   3,368,418
FLEXIBLE DRIVE CHAIN
Filed Aug. 3, 1966   2 Sheets-Sheet 1
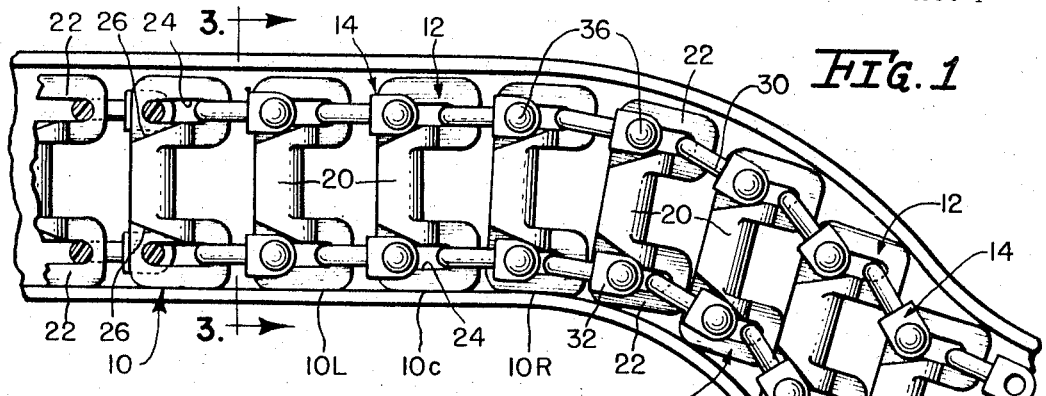
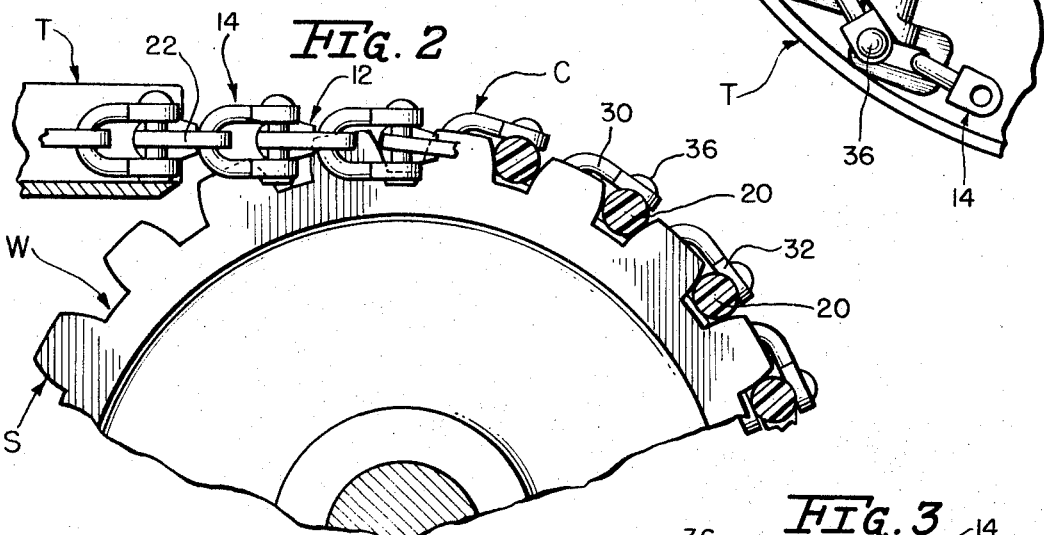
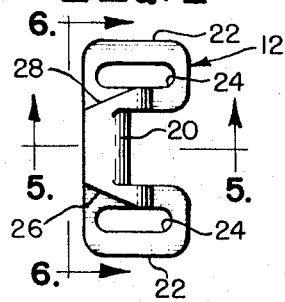
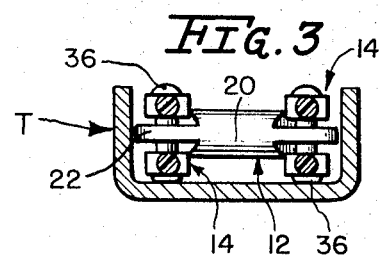
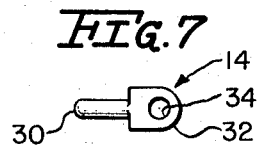
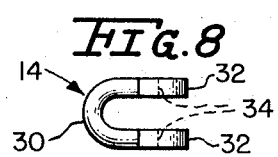
INVENTOR.
Walter J. Sagan
BY Richard W. Carpenter
Attorney

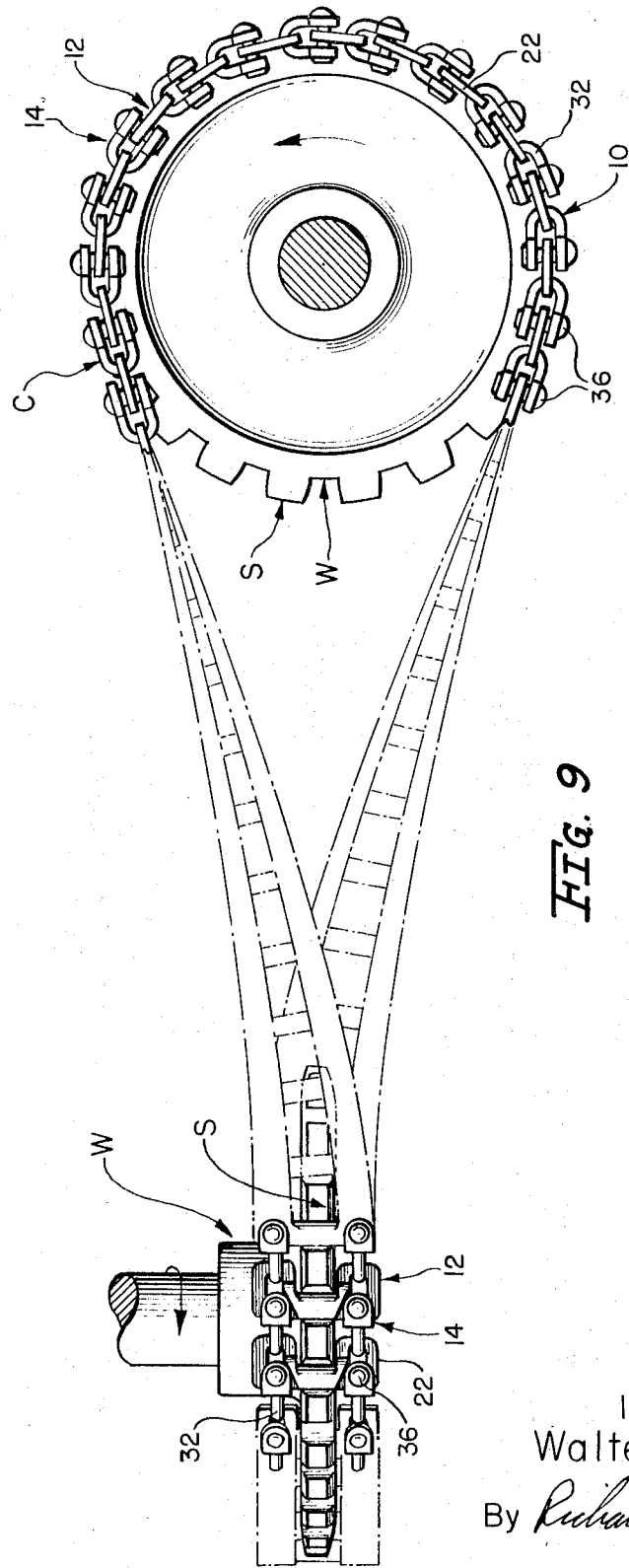

United States Patent Office 3,368,418
Patented Feb. 13, 1968

3,368,418
FLEXIBLE DRIVE CHAIN
Walter J. Sagan, 5309 S. Kostner, Chicago, Ill. 60632
Filed Aug. 3, 1966, Ser. No. 569,883
7 Claims. (Cl. 74—246)

This invention relates to chains and more particularly to a flexible drive chain for transmitting motion between driving and driven sprockets or gears.

The invention comprehends an improved drive chain having a plurality of links interconnected in such a manner as will permit the chain to be flexed or twisted in more than one direction at a time.

In all chains relative movement between adjacent links is permitted in one plane, but in many applications it is desirable to have relative movement between adjacent links in two different planes at the same time so that the chain can be twisted or flexed without breaking or becoming disengaged from related sprocket wheels.

For example, if in a gear train arrangement it is not convenient to have related gears or sprocket wheels in alignment with each other, or if the related sprocket wheels accidentally become misaligned, it is necessary for the drive chain to be deflected or twisted in order to maintain the chain in engagement with the sprocket wheels and the gear train in an operable condition.

It is therefore a primary object of this invention to provide a flexible drive chain comprising a plurality of interconnected links which are capable of relative movement in more than one plane.

A more specific object of the invention is the provision of a drive chain of the type described, wherein portions of each pair of adjacent links are interconnected at their ends by a pair of connecting members which are connected to one link for relative movement therebetween in one plane and which are connected to the other link for relative movement therebetween in a plane normal to said last mentioned plane.

These and other objects of the invention will be apparent from an examination of the following description and drawings, wherein:

FIGURE 1 is a plan view of a flexible drive chain embodying features of the invention, with the chain being shown as carried in a horizontal trough or chute;

FIGURE 2 is a side elevational view of the structure illustrated in FIGURE 1;

FIGURE 3 is a transverse, vertical section taken on line 3—3 of FIGURE 1;

FIGURE 4 is a plan view of a base member of a link of the chain illustrated in the other views;

FIGURE 5 is a vertical section taken on line 5—5 of FIGURE 6;

FIGURE 6 is a front elevational view of the structure shown in FIGURE 4;

FIGURE 7 is a side elevational view of a connecting member of a link of the chain illustrated in FIGURES 1-3;

FIGURE 8 is a top plan view of the structure illustrated in FIGURE 7; and

FIGURE 9 is a side elevation, partly in perspective, of a gear train embodying features of the invention.

It will be understood that, for purposes of clarity, certain elements of the invention have been intentionally omitted from certain views where they are illustrated to better advantage in other views.

Referring now to the drawings for a better understanding of the invention, it will be seen that the novel chain, indicated generally at C, embodying features of the invention is made up of a plurality of links, indicated generally at 10.

Each link includes a base member 12 which is movably connected at its ends by one pair of connecting members 14 to the base member of an adjacent link.

As best seen in FIGURES 4, 5 and 6, base member 10 includes an elongated central section 20 disposed to extend transversely of the chain and a pair of end sections 22 formed integrally with and extending rearwardly from the ends of the central section in a direction normal to the axis of the central section.

Each of said end sections is provided with a slightly elongated, longitudinally disposed slot 24 extending vertically therethrough, for receiving portions of the connecting members in a manner hereinafter described.

The central section is preferably thicker than the end sections and has, adjacent the end sections, a pair of outboardly facing shoulders 26 which present forwardly converging vertical abutment surfaces 28 which afford limited lateral movement of the connecting members relative to the base member.

As best seen in FIGURES 7 and 8, each of the connecting members 14 is preferably a clevis and has a U-shaped loop portion 30 and a pair of free end portions 32 presenting aligned holes 34 adapted to receive a connecting pin 36.

Again referring to FIGURE 1, it will be seen that the connections between base members of adjacent links 10L, 10C, and 10R are accomplished by connecting members 14. In link 10C and link 10L, loop portion 30 of the connecting member is disposed to extend through slot 24 of the end section 22 of the base member 12 of link 10L while the end portions of the connecting member are connected to end section 22 of the base member 12 of link 10C by pin 36 which extends through slot 24 of the base member end section of link 10C. Also, the same slot 24 of base member end section of link 10C receives the loop portion of the connecting member which connects link 10C to link 10R.

It will be noted that the connection between the loop portion of a connecting member and a link base member of one link permits relative movement therebetween in a vertical plane; whereas the connection between the head portion of a connecting member and/or link base member permits relative movement therebetween in a horizontal plane. Thus each connecting member is a universal connector which permits relative movement between adjacent links in two planes at right angles to each other, or in other words, permits the chain to be flexed or twisted in more than one direction at the same time.

An example of the relative movement between adjacent links in a horizontal plane is best seen in FIGURE 1 where the chain is shown as being carried in a curved trough T. An example of relative movement in a vertical plane is best seen in FIGURE 2 where the chain is shown as engaging the sprockets S of a sprocket wheel W. An example of relative movment in two planes at the same time is best seen in FIGURE 9.

I claim:
1. A flexible chain having a plurality of links movably interconnected for relative movement therebetween in both a vertical plane and a horizontal plane to permit flexing of the chain in any direction, each of said links comprising:
(a) a base member disposed to extend transversely of the chain;
(b) a pair of universal connecting members disposed to extend longitudinally of the chain and movably connecting ends of said base member to ends of a base member of an adjacent link;
(c) each of said connecting members being connected to said first mentioned base member for rotative movement in one plane to permit relative movement between adjacent links in said one plane;

(d) each of said connecting members being connected to said second mentioned base member for rotative movement in another plane, extending in a direction normal to said one plane, to permit relative movement between adjacent links in said other plane.

2. A flexible chain according to claim 1, wherein each of said base members has openings in the ends thereof for receiving portions of said connecting members.

3. A flexible chain according to claim 2, wherein the opening in each end of said base member receives portions of two separate connecting members.

4. A flexible chain according to claim 1, wherein each of said connecting members is a clevis, having a loop section extending through an opening in the end of a base member of one link, and having free ends pivotally connected to the end of a base member of an adjacent link by a pin extending through an opening in the end of said last mentioned base member.

5. A flexible chain according to claim 1, wherein each of said base members includes a central section and a pair of integral end sections extending therefrom in a direction normal thereto, and wherein each end section has an longated slot extending therethrough for receiving portions of two separate connecting members which connect said base member to base members of adjacent links.

6. A flexible chain according to claim 5, wherein said central section is of greater thickness than said end sections and presents shoulders with outboardly facing, diverging abutment surfaces which accommodate limited relative movement between said base member and said related connecting members.

7. A flexible chain according to claim 1, wherein each of said base members is generally U-shaped, having a central section and integral end sections extending therefrom.

References Cited
UNITED STATES PATENTS

| | | | |
|---|---|---|---|
| 377,552 | 2/1888 | Ewart | 74—246 |
| 2,613,546 | 10/1952 | Jorgensen | 74—246 |

FRED C. MATTERN, JR., *Primary Examiner.*

J. A. WONG, *Assistant Examiner.*